Patented Sept. 4, 1951

2,566,337

UNITED STATES PATENT OFFICE 2,566,337

METHOD OF CONTROLLING EXOTHERMIC
GAS REACTIONS

Louis S. Kassel, Riverside, Ill., assignor to Universal Oil Products Company, Chicago, Ill., a corporation of Delaware No Drawing. Application July 26, 1946,
Serial No. 686,440

5 Claims. (Cl. 260—449.6)

This invention relates to a method of controlling the temperature of exothermic catalytic gas reactions. It is more particularly concerned with a method of controlling, within desired narrow limits, the reaction temperature in the catalytic conversion of carbon monoxide and hydrogen to hydrocarbons.

In many catalytic processes involving the reaction of gases, the temperature maintained determines the nature of the end products and, in order to produce the desired products, the temperature must be maintained within close limits. In many such reactions the liberation of heat during the reaction makes it difficult to maintain the required temperature. Accordingly, many laboratory reactions are not commercially feasible because of the large amount of heat transfer surface necessary to remove the exothermic heat of reaction. Furthermore, in many commercial processes involving the reaction of gases the rate of reaction is limited by the amount of heat that can be removed from the reaction zone.

For example, liquid hydrocarbons boiling within the motor fuel range can be produced by passing carbon monoxide and hydrogen in the ratio of about one part of carbon monoxide to about two parts of hydrogen by volume over a suitable hydrogenating and polymerizing catalyst provided the temperature is maintained between about 375° F. and 410° F. However, if the temperature is maintained substantially above this range, carbon is deposited on the catalyst and excessive quantities of gaseous hydrocarbons such as methane are produced. At temperatures below this range very little if any reaction is brought about. Longer catalyst life and more uniform product quality are obtained if the temperature can be maintained within ±5° F. of the optimum temperature. This reaction liberates about 7,000 B. t. u.'s for each pound of hydrocarbon produced. It will be readily apparent therefore that an exceedingly difficult heat dissipation problem is involved to remove such a large amount of heat from the reaction zone and at the same time maintain the reaction temperature within such close limits.

The solid catalyst employed in the production of hydrocarbons from carbon monoxide and hydrogen may be any of the well known hydrogenating and polymerizing catalysts such as a metal of the iron group activated with oxides of aluminum, thorium, etc.

Examples of other gaseous reactions conducted in the presence of solid catalysts to which my invention is applicable are hydrogenation of iso-octene to iso-octane, the oxidation of carbon monoxide to carbon dioxide, the conversion of hydrogen and nitrogen to ammonia, and the oxidation of naphthalene to phthalic anhydride. In all of these processes there is a net decrease in the volume of the gases as the reaction proceeds. While my invention is applicable to reactions of this type, it has particular advantage in the synthesis of hydrocarbons from a mixture of carbon monoxide and hydrogen.

An object of my invention is to provide an improved method for maintaining highly exothermic gas reactions within closely controlled temperature limits. A further object is to provide an improved method of absorbing heat from the reaction zone in which gases are caused to undergo exothermic reactions, said process requiring a minimum of heat exchange equipment. A more specific object of my invention is to provide a process for the production of hydrocarbons from carbon monoxide and hydrogen in a continuous manner within prescribed temperature limits.

Other objects and advantages of my invention will be apparent from the more detailed description that follows.

In one embodiment my invention relates to a method of controlling the temperature of exothermic catalytic gas reactions which comprises passing the gaseous reactants through a reaction zone at conversion conditions in contact with a solid catalyst capable of effecting the desired reaction, charging to the top of the catalyst bed $$R\left[(N_i - N_f) + \frac{N_i}{R-1}\right]$$

mols per hour of a liquid mixture composed essentially of $R(N_i - N_f)$ mols per hour of a light component liquid with a vapor pressure at the reaction temperature when in the pure state of $$\frac{RP}{R-1} \text{ and } \frac{RN_i}{R-1}$$

mols per hour of a heavy component liquid with substantially zero vapor pressure in comparison with that of the light component, where R is substantially equal to the number of mols of liquid vaporized per mol of decrease in gas volume, $N_i$ is the mols per hour of gaseous reactants charged to the reactor, $N_f$ is the mols per hour of product and unconverted reactant gases leaving the reactor, and P is the absolute pressure expressed as pounds per square inch within the reactor.

A major problem in synthesis reactions of the Fischer-Tropsch type is to remove the large heat of reaction while maintaining a very precise temperature control. A method of control has been proposed which comprises passing a stream of vaporizable oil down through the catalyst bed countercurrent to the process gas stream. If the oil is at or near its boiling point at the plant pressure when it is admitted to the catalyst bed, it will be able to absorb heat through vaporization during its passage through the bed and therefore will absorb the heat liberated by the reaction. The temperature, however, will not be uniform at all points within the catalyst bed. For example, when the gas stream is negligible in comparison with the oil stream and heat is supplied extraneously to the reactor, fractional distillation will occur and the temperature of the oil will increase toward the bottom of the bed. The magnitude of this effect, of course, will depend upon the boiling range of the oil charged. On the other hand, if a pure compound or very narrow boiling range fraction were charged in an actual operation, the temperature of the oil would decrease toward the bottom of the bed because of the decreasing partial pressure of the oil vapors, said decrease being caused by the relative increase in the number of mols in the reactants. While these effects tend to compensate one another, it is insufficient to have an approximate compensation. The reaction temperature must be kept within a range of not more than 10° F. throughout the bed. Furthermore, although it is possible to maintain the temperature at the bottom and at the top of the catalyst bed at the same value in exothermic gas reactions when using a single vaporizable liquid as the heat absorption medium, experience has indicated, and it can be shown mathematically, that the temperature at any point within the bed will be higher than the end temperatures. I have invented a particular method of controlling the reaction temperature which employs a mixture of a volatile and a relatively nonvolatile liquid and which is capable of maintaining the temperature throughout the reaction zone within about ±5° F. of a given value.

Briefly stated, my invention as applied to the conversion of carbon monoxide and hydrogen to hydrocarbons comprises passing a gaseous mixture of carbon monoxide and hydrogen upwardly through a bed of solid catalyst, such as cobalt on kieselguhr, under conditions of time, temperature, and pressure to convert at least a portion of the carbon monoxide and hydrogen to hydrocarbons. To absorb the heat liberated during the reaction, I charge a mixture of liquids to the top of the catalyst bed. The light component of this mixture is a pure liquid compound or a relatively narrow boiling range liquid which has a vapor pressure at the reaction temperature of $$\frac{RP}{R-1}$$

where R is the number of mols of liquid vaporized per mol of shrinkage in total synthesis vapor and P is the absolute pressure within the reactor. By total synthesis vapor I mean to include hydrogen, carbon monoxide, carbon dioxide, water, inerts, and all of the hydrocarbon and oxygenated products of the reaction and to exclude the vaporized heat absorption medium. The heavy component of the mixture is a liquid with a substantially zero vapor pressure relative to that of the light component. The mixture is charged to the reactor at the rate of approximately $$R\left[(N_i - N_f) + \frac{N_i}{R-1}\right]$$

mols per hour of which $R(N_i - N_f)$ mols per hour is the light component and the remainder, i. e., $$\frac{RN_i}{R-1}$$

mols per hour, is the heavy component. $N_i$ is the inlet gas rate to the reactor expressed as mols per hour. $N_f$ is the mols per hour of outlet gas including water and hydrocarbon reaction products but not vaporized heat absorption medium. As this mixture of the light and heavy component flows down through the catalyst bed, the light component is vaporized at a rate such that the heat of reaction is absorbed as it is liberated. The liquid mixture should be preheated to approximately the reaction temperature before being charged to the catalyst bed. The vaporized light component leaves the reactor with the reaction products and the unconverted carbon monoxide and hydrogen and is separated therefrom for further use. The heavy component flows down through the bed and is withdrawn from the bottom of the reactor. It too is recovered for further use. An additional advantage derived from this method of controlling the reaction temperature is that the heavy component tends to dissolve and remove from the catalyst any waxlike reaction products that tend to form thereon.

The light and heavy components do not have to exactly meet the specifications set forth above in order to obtain a satisfactory uniformity of temperature throughout the reaction zone. Instead of using a pure compound as the light component, a narrow boiling liquid fraction may be used. The heavy component should have an initial boiling point of at least 100° F. and preferably about 150° F. above the end point of the light fraction. Thus if I desire to operate at 400° F. and 100 p. s. i. g. with a value of $R=5$, the light component should have a vapor pressure of approximately 143 p. s. i. g. at 400° F. or a normal boiling point of about 210° F. A 200–220° F. saturated hydrocarbon fraction would be suitable. The heavy component could then be the gas oil fraction of the reaction product.

Although the vapor pressures and rates of the components are most conveniently and accurately determined from the formulas given above, they can also be determined in another manner. To illustrate, the volatility and rate of the vaporizable component may be determined from a consideration of the reactor temperature and pressure, the reactant charge rate, and the degree of conversion. The rate will then be such that the amount of the light component charged to the reactor is just sufficient to absorb the heat of reaction through vaporization. The volatility will be such that the actual temperature in the catalyst bed will be approximately equal to that previously selected. The actual temperature, however, will not be uniform throughout the bed. It can be made uniform by charging along with the light component, the correct amount of a nonvolatile component. The latter rate can be found by charging increasing amounts of the nonvolatile component to the top of the bed and noting the temperature difference between two different points in the bed. When this differential equals zero, the correct rate has been reached.

The liquids preferred as temperature control means are hydrocarbons of suitable boiling range. However, other organic materials such as oxygenated compounds and the like may also be used. The liquids employed should be substantially inert under the conditions prevailing in the conversion zone. I frequently have found that appropriate fractions of the reaction products meet the necessary requirements.

My invention is applicable not only to processes involving exothermic gas reactions in the presence of a stationary bed of solid catalyst, but it is also applicable to processes of this nature employing moving beds of solid catalyst. In moving bed processes the catalyst is transported by physical or mechanical means through a reaction zone as a single continuous bed or as a series of smaller beds. For the processes of this invention the direction of travel of the catalyst within the reactor may be either upward or downward.

I claim as my invention:

1. In exothermic catalytic gas reactions in which gaseous reactants are passed through a bed of solid catalyst at conversion conditions, the method of controlling the temperature within said bed substantially constant which comprises passing through said catalyst bed countercurrently to the flow of the incoming gaseous reactants a heated liquid mixture consisting essentially of a volatile liquid component and a relatively non-volatile component, said relatively non-volatile component having an initial boiling point substantially higher than the end boiling point of the volatile component, regulating the amount of volatile liquid component in the mixture so that said component will be substantially completely vaporized during its passage through the catalyst bed and will effect the substantially complete absorption of the exothermic heat of reaction and regulating the quantity of non-volatile component in the mixture to compensate for the decreasing volatility of the volatile liquid component as it passes downwardly through the bed and the decreasing volume of gaseous reactants as they pass upwardly through the catalyst bed thereby preventing any substantial temperature gradient in the catalyst bed.

2. In exothermic catalytic gas reactions in which gaseous reactants are passed through a bed of solid catalyst at conversion conditions, the method of controlling the temperature within the catalyst bed substantially constant which comprises passing through said catalyst bed countercurrently to the flow of the incoming gaseous reactants a heated liquid mixture consisting essentially of a volatile liquid and a substantially non-volatile liquid having an initial boiling point substantially higher than the end boiling point of the volatile liquid, the volatile liquid removing the exothermic heat of reaction from the catalyst bed by the volatilization thereof and the non-volatile liquid preventing any substantial temperature gradient through the bed as a result of variance in gas of a diminishing volume of reactants during their passage through the bed and decreased volatility of the volatile liquid through the bed and maintaining the total quantity of said liquid mixture charged to the reaction zone in accordance with the expression $$R\left[(N_i-N_f)+\frac{N_i}{R-1}\right]$$

of which $R(N_i-N_f)$ is the moles per hour of volatile material having a vapor pressure at the reaction temperature of $$\frac{RP}{R-1}$$

which amount is just sufficient to absorb the heat of reaction through vaporization, and $$\frac{RN_i}{R-1}$$

is the moles per hour of non-volatile material where R is substantially equal to the number of moles of liquid vaporized per mole of decrease in gas volume, $N_i$ is the moles per hour of gaseous reactants charged to the reactor, $N_f$ is the moles per hour of product and unconverted gases leaving the reactor, and P is the absolute pressure expressed as pounds per square inch within the reactor.

3. In a process of producing hydrocarbons from carbon monoxide and hydrogen by passing a mixture of said gases upwardly through a bed of solid catalyst maintained at conversion conditions, the method of controlling the reaction temperature within said catalyst bed substantially constant which comprises passing through said catalyst bed countercurrently to the incoming gaseous reactants a heated liquid mixture consisting essentially of a volatile hydrocarbon and a substantially non-volatile hydrocarbon having an initial boiling point substantially higher than the end boiling point of the volatile hydrocarbon, the volatile hydrocarbon removing the exothermic heat of reaction from the catalyst zone by the vaporization thereof and the non-volatile hydrocarbon preventing any substantial temperature gradient through the bed because of the decreasing volume of gaseous reactants during their passage upwardly through the bed and the decreasing volatility of the volatile hydrocarbon during its passage downwardly through the bed and maintaining the rate of charge of the liquid mixture in moles per hour to the reaction zone in accordance with the expression $$R\left[(N_i-N_f)+\frac{N_i}{R-1}\right]$$

of which $R(N_i-N_f)$ is the moles per hour of volatile hydrocarbon having a vapor pressure at the reaction temperature of $$\frac{RP}{R-1}$$

which amount is just sufficient to absorb the heat of reaction through vaporization, and $$\frac{RN_i}{R-1}$$

is the moles per hour of non-volatile hydrocarbon where R is substantially equal to the number of moles of liquid vaporized per mole of decrease in gas volume, $N_i$ is the moles per hour of gaseous reactants charged to the reactor, $N_f$ is the moles per hour of product and unconverted gases leaving the reactor, and P is the absolute pressure expressed as pounds per square inch within the reactor.

4. A method of producing hydrocarbons which comprises passing a mixture of carbon monoxide and hydrogen in the ratio of about 1 mole of carbon monoxide to about 2 moles of hydrogen upwardly through a bed of solid catalyst capable of promoting the conversion of carbon monoxide and hydrogen to hydrocarbons, controlling the temperature in the catalyst bed by passing there-through countercurrently to the flow of incoming gases a liquid hydrocarbon fraction consisting essentially of a light narrow-boiling range hydrocarbon fraction and a heavy substantially non-volatile hydrocarbon fraction having an initial boiling point substantially higher than the end boiling point of the volatile hydrocarbon fraction, the light hydrocarbons removing the exothermic heat of reaction by the vaporization thereof and the heavy hydrocarbons preventing any temperature gradient throughout the catalyst bed because of decreasing volatility of the light hydrocarbon fraction during its passage downwardly through the catalyst bed and the decreasing volume of reactants as they pass upwardly through the catalyst bed.

5. In an exothermic catalytic gas reaction in which gaseous reactants are passed upwardly through a bed of solid catalyst particles in a reaction zone, the method of maintaining a substantially uniform temperature throughout said bed which comprises charging to the top of the bed a preheated liquid mixture consisting essentially of a narrow boiling light component vaporizable under the conditions prevailing in the reaction zone, and a relatively nonvolatile heavy component that is substantially nonvaporizable under the conditions prevailing in the reaction zone and having an initial boiling point at least about 100° F. higher than the end boiling point of said light component, the amount of light component charged being such that it is substantially completely vaporized during passage through the bed, and the amount of heavy component charged being such as to maintain a substantially uniform temperature throughout the bed.

LOUIS S. KASSEL.

REFERENCES CITED

The following references are of record in the file of this patent:

UNITED STATES PATENTS

| Number | Name | Date |
|---|---|---|
| 1,984,380 | Odell | Dec. 18, 1934 |
| 2,167,004 | Pier et al. | July 25, 1939 |
| 2,406,851 | Redcay | Sept. 3, 1946 |